US007003087B2

(12) United States Patent
Spencer et al.

(10) Patent No.: US 7,003,087 B2
(45) Date of Patent: Feb. 21, 2006

(54) INTELLIGENT CALL SCREENING SYSTEM

(75) Inventors: Bradford Lawrence Spencer, Halifax (CA); David Webster Trueman, Halifax (CA)

(73) Assignee: America Online, Inc., Dulles, VA (US)

( * ) Notice: Subject to any disclaimer, the term of this patent is extended or adjusted under 35 U.S.C. 154(b) by 106 days.

(21) Appl. No.: 10/674,821

(22) Filed: Oct. 1, 2003

(65) Prior Publication Data
US 2005/0053216 A1 Mar. 10, 2005

Related U.S. Application Data

(60) Provisional application No. 60/477,925, filed on Jun. 13, 2003.

(51) Int. Cl.
H04M 3/42 (2006.01)
(52) U.S. Cl. .............................. 379/211.01; 379/88.18; 379/215.01
(58) Field of Classification Search ................ 370/259, 370/352; 379/88.13, 88.18, 88.26, 211.01, 379/88.12, 88.17, 211.02, 215.01
See application file for complete search history.

(56) References Cited

U.S. PATENT DOCUMENTS

| 5,329,578 | A | 7/1994 | Brennan et al. |
| 5,375,161 | A | 12/1994 | Fuller et al. |
| 5,422,942 | A | 6/1995 | Kakwashima |
| 5,537,467 | A | 7/1996 | Cheng et al. |
| 5,548,636 | A | 8/1996 | Bannister et al. |
| 5,557,659 | A | 9/1996 | Hyde-Thomson |
| 5,651,054 | A | 7/1997 | Dunn et al. |
| 5,703,943 | A | 12/1997 | Otto |
| 5,805,587 | A * | 9/1998 | Norris et al. ............... 370/352 |
| 5,809,128 | A | 9/1998 | McMullin |
| 5,841,966 | A | 11/1998 | Irribarren |
| 5,848,134 | A | 12/1998 | Sekiguchi et al. |
| 5,894,504 | A * | 4/1999 | Alfred et al. ............ 379/88.13 |
| 5,937,051 | A | 8/1999 | Hurd et al. |
| 6,038,293 | A | 3/2000 | McNerney et al. |
| 6,144,644 | A * | 11/2000 | Bajzath et al. ............... 370/259 |
| 6,215,857 | B1 | 4/2001 | Kasiviswanathan |
| 6,282,275 | B1 | 8/2001 | Gurbani et al. |
| 6,295,341 | B1 | 9/2001 | Muller |
| 6,301,609 | B1 | 10/2001 | Aravamudan et al. |
| 6,311,231 | B1 | 10/2001 | Bateman et al. |
| 6,353,660 | B1 * | 3/2002 | Burger et al. ............ 379/88.17 |
| 6,356,633 | B1 | 3/2002 | Armstrong |

(Continued)

FOREIGN PATENT DOCUMENTS

EP  0 959 593 A2 * 11/1999

(Continued)

OTHER PUBLICATIONS

Rick James: "FINALLY! Interactive 'Call Waiting' While You're Surfing?", Internet Document, [Online], pp. 1-4, Retrieved from the Internet: www.monitor.ca/monitor/issues/vol4iss12/feature7. html, [retrieved on Sep. 2, 2004].

(Continued)

Primary Examiner—Bing Q. Bui
(74) Attorney, Agent, or Firm—Fish & Richardson P.C.

(57) ABSTRACT

Screening a traditional telephony call made by a calling party to a called party includes receiving, over a telephone network, the traditional telephony call from the calling party at a messaging service platform, recording an audio message from the calling party as audio data, and transmitting the audio data from the messaging service platform to a computer of the called party while the calling party is leaving the audio message. Before the calling party finishes leaving the audio message, the called party perceives the transmitted audio data and reacts to the traditional telephony call in response to the audio message.

50 Claims, 11 Drawing Sheets

U.S. PATENT DOCUMENTS

| | | | |
|---|---|---|---|
| 6,366,661 B1 * | 4/2002 | Devillier et al. | 379/211.01 |
| 6,373,836 B1 | 4/2002 | Deryugin et al. | |
| 6,377,668 B1 * | 4/2002 | Smock et al. | 379/142.08 |
| 6,389,007 B1 | 5/2002 | Shenkman et al. | |
| 6,396,908 B1 * | 5/2002 | O'Donovan et al. | 379/88.18 |
| 6,404,747 B1 | 6/2002 | Berry et al. | |
| 6,421,425 B1 * | 7/2002 | Bossi et al. | 379/52 |
| 6,463,145 B1 | 10/2002 | O'Neal et al. | |
| 6,477,246 B1 | 11/2002 | Dolan et al. | |
| 6,496,501 B1 | 12/2002 | Rochkind et al. | |
| 6,498,841 B1 * | 12/2002 | Bull et al. | 379/142.08 |
| 6,518,994 B1 | 2/2003 | Johnson et al. | |
| 6,529,587 B1 * | 3/2003 | Cannon et al. | 379/88.18 |
| 6,532,286 B1 * | 3/2003 | Burg | 379/209.01 |
| 6,567,854 B1 * | 5/2003 | Olshansky et al. | 709/229 |
| 6,631,399 B1 | 10/2003 | Stanczak et al. | |
| 6,671,365 B1 | 12/2003 | Kemppainen | |
| 6,724,867 B1 * | 4/2004 | Henderson | 379/88.22 |
| 6,738,461 B1 | 5/2004 | Trandal et al. | |
| 6,757,274 B1 * | 6/2004 | Bedingfield et al. | 370/352 |
| 6,775,378 B1 | 8/2004 | Villena et al. | |
| 2003/0133558 A1 | 7/2003 | Kung et al. | |

FOREIGN PATENT DOCUMENTS

| | | |
|---|---|---|
| EP | 1 120 954 | 8/2001 |
| EP | 1 148 756 | 10/2001 |
| WO | WO 00/60809 | 10/2000 |
| WO | WO 01/76210 | 10/2001 |

OTHER PUBLICATIONS

ANONYMOUS: "Does the Internet Have Call Waiting?", Internet Document, [Online] Copyright 2002, Tech TV, Inc., pp. 1-2, Retrieved from the Internet: www.techtv.com/screensavers/print/0,23102,2256423,00.html [retrieved on Oct. 2, 2002].

ANONYMOUS: "Did Someone Just Call You", Internet Document, [Online] Copyright 2002, CallWave, Inc., p. 1, Retrieved from the Internet: www.callwave.com, [retrieved on Oct. 2, 2002].

ANONYMOUS: "Internet Answering Machine ™ Software", Internet Document, [Online]Copyright 2002, CallWave, Inc. pp. 1-2, [Retrieved from the Internet: www.callwave.com/findoutmore.asp?ct=hp 1 _fom, Oct. 2, 2002].

Copy of the International Search Report issued in PCT/US2004/018785 dated Oct. 27, 2004.

Copy of the Written Opinion from the International Authority in PCT/US2004/018785.

Office Action, U.S. Appl. No. 10/747,256, dated Mar. 25, 2005.

International Search Report and the Written Opinion of the International Searching Authority, International Application No. PCT/US04/32562, dated Apr.12, 2005, 9 pages.

* cited by examiner

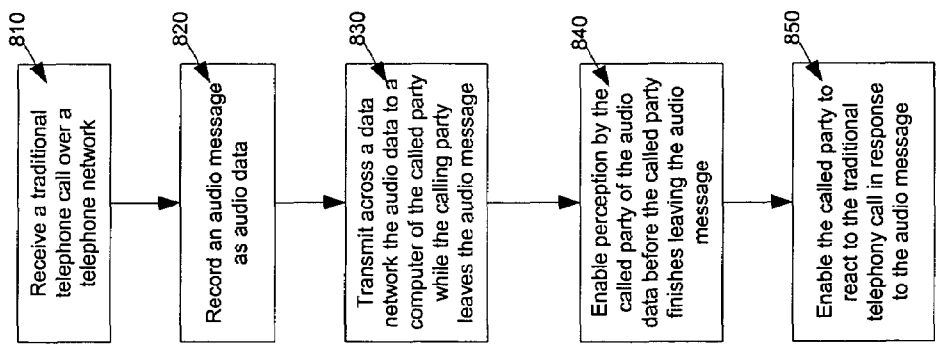

INTELLIGENT CALL SCREENING SYSTEM

CROSS REFERENCE TO RELATED APPLICATION

This application claims priority to U.S. Provisional Patent Application No. 60/477,925, filed Jun. 13, 2003, and titled INTELLIGENT CALL SCREENING. This application incorporates by reference U.S. patent application Ser. No. 10/414,167, filed Apr. 15, 2003, and titled COMMUNICATION DEVICE MONITORING and U.S. patent application Ser. No. 10/320,712, filed Dec. 17, 2002, and titled CASCADED DELIVERY OF AN ELECTRONIC COMMUNICATION.

TECHNICAL FIELD

This application relates to a network-based call screening service and system for handling traditional telephony calls.

BACKGROUND

Call screening is a telephony service that offers call recipients the ability to listen to a voice message as the voice message is being deposited by a caller. In traditional telephony paradigms, a telephone answering device (TAD) is located at a call recipient's location to enable a call recipient to screen incoming calls. The TAD can record a voice message left by a caller and concurrently play the voice message out loud. If the call recipient is present while the voice message is being recorded, the call recipient may listen to the voice message and identify the calling party without indicating to the calling party that the call recipient is present. In this manner, the call recipient may "screen" the call by taking the call or not taking the call based on recognition of the voice of the caller or based on the contents of the deposited voice message.

SUMMARY

In one general aspect, screening a traditional telephony call made by a calling party to a called party includes receiving, over a telephone network, the traditional telephony call from the calling party at a messaging service platform, recording an audio message from the calling party as audio data, and transmitting the audio data from the messaging service platform to a computer of the called party while the calling party is leaving the audio message. Before the calling party finishes leaving the audio message, the called party perceives the transmitted audio data and reacts to the traditional telephony call in response to the audio message.

Implementations may include one or more of the following features. For example, screening a traditional telephony call may further include transcoding the audio data using an audio compression scheme prior to transmitting the transcoded audio data from the messaging service platform to the computer of the called party while the calling party is leaving the audio message. The audio compression scheme may be MPEG Layer III Audio.

The audio data may be sent over a data network. The voice path of the traditional telephony call may only traverse the telephone network. Enabling the called party to react to the traditional telephone call may include generating a call screening message in response to the received traditional telephony call. The call screening message may include options that may be selected by the called party to react to the traditional telephony call. The options may include an option to send an outbound audio message to be perceived by the calling party and an option to send the traditional telephony call to a predetermined call destination. The predetermined call destination may or may not be a direct number of a phone of the called party.

Enabling the called party to react to the traditional telephony call may include sending a call screening message to the computer of the called party if an online identity associated with the called party is online approximately when the traditional telephony call is received at the messaging service platform. Enabling the called party to react to the traditional telephony call may include enabling a display corresponding to the call screening message and may include removal of a display corresponding to the call screening message when the audio message recording completes.

Enabling the called party to react to the traditional telephony call may include enabling options to be selected while the audio message is being recorded at the messaging service platform, receiving an option selection from the computer of the called party, and handling the traditional telephony call in accordance with the received option selection. Handling the traditional telephony call may include sending an outbound audio message to be perceived by the calling party and sending the traditional telephony call to a predetermined call destination that may or may not be the direct number of a phone of the called party.

Screening a traditional telephony call may further include checking for online presence of the called party. Screening a traditional telephony call may further include notifying the called party of the call details by transmission of data relating to the call from the messaging service platform to a computer of the called party.

In another general aspect, a computer system for screening a traditional telephony call made by a calling party to a called party receives, over a telephone network, the traditional telephony call from the calling party, records an audio message from the calling party as audio data, and transmits the audio data to a computer of the called party while the calling party is leaving the audio message. Before the calling party finishes leaving the audio message, the computer system enables perception by the called party of the transmitted audio data and enables the called party to react to the traditional telephony call in response to the audio message.

The details of one or more implementations are set forth in the accompanying drawings and the description below. Other features will be apparent from the description and drawings, and from the claims.

DESCRIPTION OF DRAWINGS

FIG. 8 is a flow chart illustrating a process for screening a traditional telephony call.

DETAILED DESCRIPTION

Figure 1:
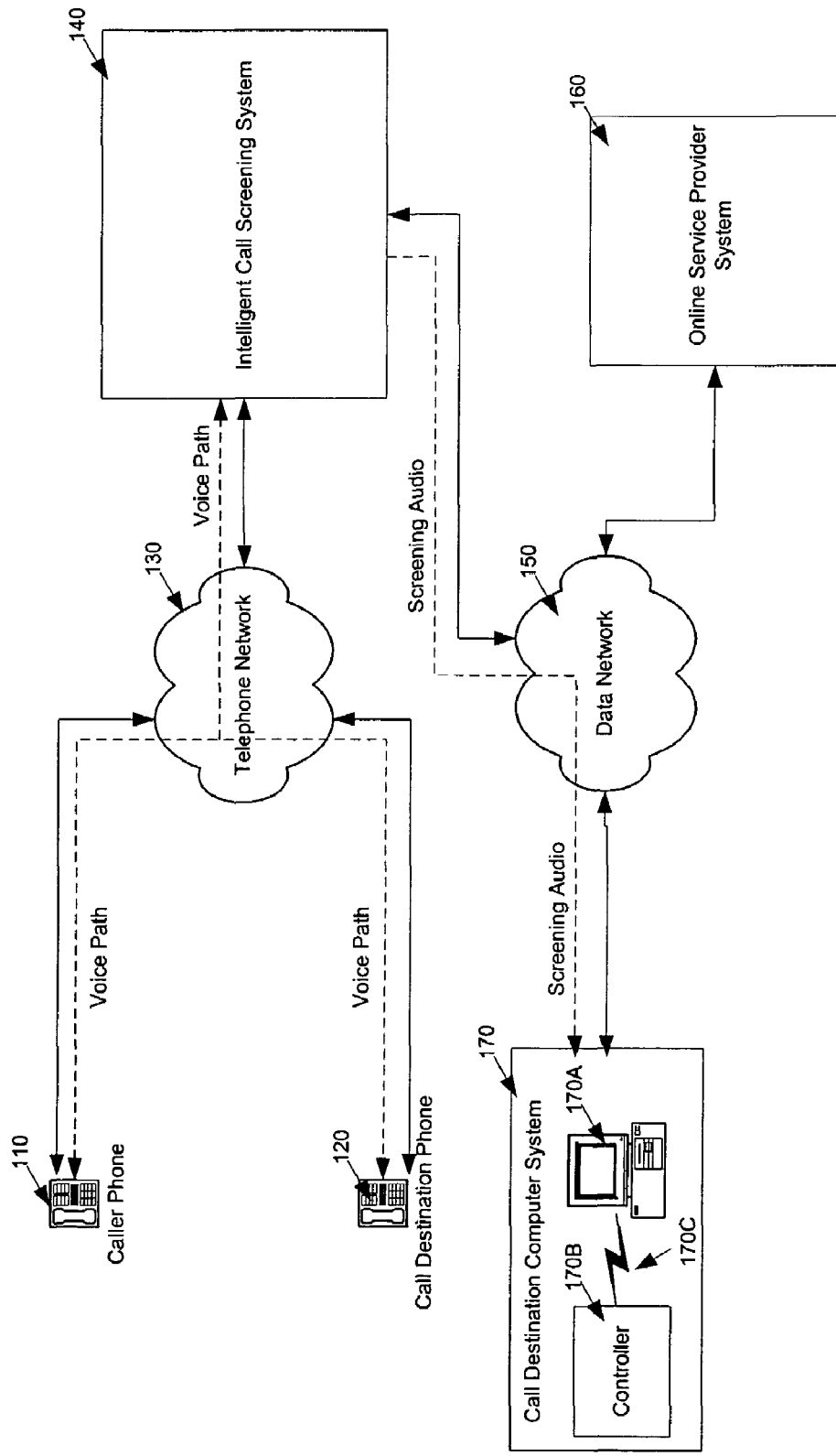
FIG. 1 is a block diagram of a communications system for screening traditional telephony calls.

A communications system for screening traditional telephony calls includes a caller phone used to call a call destination phone over a telephone network. The telephone network is configured to redirect the call to an intelligent call screening system (ICSS) (or messaging service platform) if the direct number of the call destination phone is busy or is not answered after a predetermined number of rings or using the telephone network feature SIMRING or using an Advanced Intelligent Network (AIN) trigger. The telephone network is a traditional circuit-switched telephone network such as, for example, the public-switched telephone network (PSTN).

The ICSS receives the call and possibly sends a greeting message to the caller over the telephone network. Prior to prompting the caller to leave a voice message, the ICSS identifies an online identity associated with the direct number of the destination phone and requests the online status of the online identity from an online service provider system. If the online identity is online or otherwise available to receive communications, the ICSS sends a call notification message to the online service provider system, which relays the call notification message over a data network to a call destination computer system associated with the online identity. The call notification message enables the user of the call destination computer to ignore the call, take a message, take the call, or redirect the call to another number. If the user selects to take a message, the ICSS accepts the call, sends a greeting message to be heard by the caller, and prompts the caller to leave a voice message. The ICSS generates and sends a call screening message to the online service provider system, which relays the call screening message over the data network to the call destination computer system.

The call destination computer system enables the user to perceive the call notification message and subsequently the call screening message, for example, using a visual display such as a dialog box. The call notification message notifies the user of the identity of the caller and includes call reaction options that the user of the call destination computer system may select to react to the call. The call reaction options include taking a message, taking the call, and redirecting the call to another number. The option selected by the user is sent by the call destination computer system to the online service provider system, which relays the option selection to the ICSS. The ICSS communicates with the telephone network to react to the call in accordance with the option selection. The ICSS does not accept the call (i.e., the caller hears a ringing signal) until an option selection has been received or, in some implementations, until after a predetermined interval of time passes and a default option selection is received or otherwise determined. If the option selection corresponds to taking a message, the ICSS records the voice message as audio data as the voice message is received from the caller phone over the telephone network. The ICSS streams the audio data to the call destination computer system over the data network. The ICSS also generates and sends a call screening message to the call destination computer system. The call screening message is similar to the call notification message; however, the exception that the user of the call destination computer system selects options while concurrently listening to the voice message being deposited. Selection of an option may interrupt the recording of the voice message in midstream.

The call between the caller phone and the destination phone that is redirected to the ICSS is a traditional telephony call that is setup over a telephone network (i.e., the voice path of the call only traverses a telephone network). In contrast, the audio data used to screen the call is sent over a data network such as, for example, the Internet.

The communications system for screening traditional telephony calls described above is notably different from a communications system that screens computer telephony calls. Computer telephony calls are a form of telephony in which one of the premises endpoints uses a digital computing device rather than a conventional telephone handset. The digital computing device receives call data over a data network through data network routers. In computer telephony, the voice path of the call traverses, at least in part, a data network. In traditional telephony, the voice path of the call traverses a telephone network and does not traverse a data network. Since data networks typically do not offer the quality of service of a traditional telephone network due to such quality problems as latency, packet loss, and jitter, real time dialog over a voice path that traverses a data network may be degraded. The communications system for screening traditional telephony calls offers the advantage that the voice path of the call does not traverse a data network. Accordingly, the deposited voice message and, if the call is redirected, the subsequent real time dialog are not distorted or degraded by quality problems or otherwise impacted by the data network. Furthermore, the communications system for screening traditional telephony calls may screen calls when both premises endpoints use conventional telephone handsets.

The call screening function is not as sensitive to system latency as telephony functions related to real time dialog and therefore, may be advantageously implemented over a data network. For example, while the maximum system latency allowed for telephony functions related to real time dialog is on the order of a few hundred milliseconds, the maximum system latency allowed for a call screening function is near real time and may be on the order of a few seconds. Accordingly, sending the call screening message and the audio data over a data network does not degrade the quality of the call screening function and takes advantage of the ubiquity and highly mobile nature of connections to a data network such as, for example, the Internet.

An example of near real time transmission over a data network is implemented by instant messaging systems to send and receive instant messages. Furthermore, near real time transmission may be achieved by configuring a data transmission system to minimize, avoid or altogether prohibit queuing or further processing of received data in any way that increases transmission delay. Moreover, real time generally implies communication without undue or user-perceived delays. The following characteristics are indicative of near real time: (1) communications over a network capable of showing or monitoring user presence, (2) communication over a network that neither buffers nor processes data in a manner that increases transmission delay.

In one implementation example, a call recipient is vacationing in Australia and is online. The call recipient receives a call screening message that states that a business partner of his is calling his home number in California. The call recipient is able to hear the voice message as the voice message is being recorded. The call recipient then redirects the call to his cabin in Australia by selecting an appropriate option presented or made available to the call recipient while the voice message is being deposited. In response to the selection, the call is redirected by the telephone network to the call recipient's conventional telephone handset in his cabin. Once redirected, the call recipient picks up the call and converses with his business partner seamlessly without any degradation in audio quality since the entire audio path is over the traditional PSTN.

Referring to FIG. 1, a communications system 100 for screening traditional telephony calls includes a caller phone 110, a call destination phone 120, a telephone network 130, an ICSS 140, a data network 150, an online service provider system 160, and a call destination computer system 170.

The caller phone 110 may place a call to the call destination phone 120 over the telephone network 130. The caller phone 110 and the call destination phone 120 may be landline phones that allow communications over the telephone network 130. In another implementation, the caller phone 110 and/or the call destination phone 120 may be cellular phones or mobile personal digital assistant (PDA) with embedded cellular phone technology. In yet another implementation, the call destination phone 120 and the call destination computer system 170 are integrated into a single computer system capable of receiving calls over the telephone network 130 and receiving data over the data network 150.

The telephone network 130 is configured to enable direct or indirect voice communications between the caller phone 110, the call destination phone 120, and the ICSS 140. If a user of the caller phone 110 places a call to the call destination phone 120 and the direct number corresponding to the call destination phone 120 is busy or not answered after a predetermined number of rings, the telephone network 130 is configured to forward the call to the ICSS 140 (i.e., a call forward busy/no answer service is enabled on the phone line of the call destination phone 120). In another implementation, the PSTN SIMRING feature may cause the ICSS 140 to receive the call simultaneously with the call destination phone 120. In yet another implementation an Advanced Intelligent Network (AIN) trigger may cause the ICSS 140 to be signaled of the call and ICSS 140 may request that the call be directed to ICSS 140.

When the call is forwarded to the ICSS 140, the telephone network 130 is configured to send call-related information to the ICSS 140 over a signaling channel. The call-related information includes call origin and call destination information. The call origin information may include the direct number of the caller phone 110 and the time and date when the call was initiated, and the call destination information may include the direct number of the call destination phone 120. The call origin information may be delivered, for example, through a service known as Automatic Number Identification (ANI), and the call destination information may be delivered, for example, through a service known as Dialed Number Identification Service (DNIS).

The telephone network 130 also is configured to receive call handling instructions from the ICSS 140. The call handling instructions provide instructions to the telephone network 130 for processing a call. The call handling instructions may include, for example, instructions that accept the call (i.e., redirect the call to the call destination phone 120), refuse the call (i.e., disconnect the call), and forward the call to another telephone number. ICSS 140 may have to execute several instructions to effect each such call treatment.

The telephone network 130 may be of any type including, for example, the public switched telephone network (PSTN), international networks or a combination of networks. For example, the telephone network 130 may include the AT&T interexchange (IXC) network and/or central offices of local exchange carriers (LECs). The telephone network 130 is typically circuit-switched.

The ICSS 140 is a computer system configured to receive a call from the caller phone 110 that has been forwarded to the ICSS 140 by the telephone network 130. The ICSS 140 receives the call destination direct number from the telephone network 130 and identifies an online identity associated with the call destination direct number. The ICSS 140 requests the online status of the online identity from the online service provider system 160. Possibly after interacting with the online user, the ICSS 140 also sends a greeting message to the caller phone 110.

If the online identity is not online, the ICSS 140 is configured to prompt the caller to leave a voice message and records the voice message. The voice message then is stored by the ICSS 140 for subsequent retrieval by the call recipient. The user may possibly store other preferences for treatment of calls received while not online.

The ICSS 140 is configured to generate a call notification message and a call screening message in accordance with call screening preferences set up by the call recipient, if the online identity is online. The call screening preferences may include, for example, instructions prohibiting the ICSS 140 from sending a call notification message or call screening message to the online identity when the direct number of the caller phone 110 has been placed on a prohibited list. The call screening preferences also may include instructions regarding how the call notification message and call screening message sent to the online identity should be formatted and what options should appear in the call notification message and call screening message. The options may include a number of different outbound audio messages that may be sent to the caller when the call is being redirected and a number of different phone numbers that may be used for call redirection. The ICSS 140 sends the call notification messages and call screening messages to the online service provider system 160, which sends format data along with the call notification message, and call screening message over the data network 150 to the call destination computer system 170 for presentation to the user.

If an incoming call is received, the ICSS 140 generates a call notification message that enables the user to react to the incoming call by selecting from among various options in the call notification message. The user of the call destination computer system 170 may select an option presented in the call notification message. The option selection is sent to the online service provider system 160 over the data network 150. The online service provider system 160 relays the option selection to the ICSS 140, which processes the option selection accordingly.

If the option selection corresponds to taking a message, the ICSS 140 accepts the call, sends a greeting message to the caller, and prompts the caller to leave a message. The ICSS 140 records the voice message as audio data as the voice message is received over the telephone network 130. The ICSS 140 sends the audio data as a data stream to the call destination computer system 170 for presentation to the user. The ICSS 140 concurrently or subsequently generates and sends a call screening message to the call destination computer system 170. The call screening message is similar to the call notification message in that it includes options regarding how to react to the call. The options include ignoring the call, taking the call, and redirecting the call to another number. However, the call screening message is different than the call notification message in that the user of the call destination computer system 170 selects an option after the call has been accepted and while the voice message is being deposited by the caller. The option presented in the call screening message, therefore, may be selected based on the content of the deposited voice message.

If the user of the call destination computer system 170 does not select an option prior to the caller finishing leaving a voice message, the completed voice message is stored by the ICSS 140 for subsequent retrieval by the user. If the user of the call destination computer system 170 selects an option before the caller finishes leaving a voice message, the ICSS 140 processes the option selection. If the selected option corresponds with taking a message, the ICSS 140 ends the transmission of the audio data to the call destination computer system 170 and completes the recording and storage of the voice message. If the selected option corresponds with refusing the call, the ICSS 140 disconnects the call and terminates the recording and storage of the voice message. In some implementations, the ICSS 140 also deletes the stored incomplete voice message. If the selected option corresponds with taking the call or redirecting the call to another telephone number, the ICSS 140 sends a call handling instruction to the telephone network 130 and, in some implementations, sends an outbound audio message to the caller phone 110 over the telephone network 130 indicating that the call is being picked up or redirected. In either case, the incomplete message is typically stored by the ICSS 140 for subsequent retrieval by the user.

The ICSS 140 is configured to record, store, access, and play outbound audio messages. The outbound audio messages may be personalized by subscribers to the intelligent call screening service and may be stored in a data store and indexed, for example, by direct number of the subscriber call destination phone.

The data network 150 may be any type of network that carries data including, for example, the Internet, an intranet or any combination of data bearing networks. The data network 150 may be, for example, a data network using Internet Protocol (IP). The term "data" as used herein is representation of information in a formalized manner suitable for communication, interpretation or processing. This information can include, for example, text, audio, image, video, and/or multimedia. Segments of related data being carried within the data network 150 are referred to herein as a "data stream." For example, the data being carried within the data network 150 and representing the audio data used for call screening is referred to as an audio "data stream."

The online service provider system 160 is a computer system configured to provide online data communications services to users, detect online presence of a user of a call destination computer system 170, receive a call notification and a call screening message from the ICSS 140, generate format data and send the format data along with the call notification message and call screening message to the call destination computer system 170, and send option selections from the call destination computer system 170 to the ICSS 140. The online data communications services may include for example, e-mail services, instant messaging services, Internet access, and/or access to online content.

The online service provider system 160 may, for example, detect online presence of a user of the call destination computer system 170 in a manner similar to that used to detect presence in an Instant Messaging system and/or in a manner similar to that disclosed in application Ser. No. 10/414,167, hereby incorporated by reference in its entirety (in which client-side communication device monitors are used). The online service provider system 160 is also configured to receive a call notification message and a call screening message from the ICSS 140, generate format data that is used to format the call notification and call screening messages for presentation on the call destination computer system 170, and send the call notification and call screening messages to the call destination computer system 170 in near real time.

The online service provider system 160 is also configured to transmit, in near real time, the option selection from the call destination computer system 170 to the ICSS 140. Near real time transmission of the option selection is important because transmission delays can result in a missed call. If the option selection is not received and processed by the ICSS 140 before the caller finishes leaving a voice message, the call may be disconnected and may no longer be redirected in accordance with the received option selection. Furthermore, a noticeable time lag between option selection and call redirection may be particularly undesirable to a call screening subscriber that has become accustomed to the fast responsivity of traditional call screening solutions (e.g., using an answering machine to screen calls). Accordingly, the online service provider system 160 may be configured to avoid or altogether prohibit queuing call notification and call screening messages or option selections or further processing the call notification messages, call screening messages, or option selections in any way that increases transmission delay. The online service provider system 160 may be configured to provide this functionality in a manner similar to that used by instant messaging systems, or even to leverage instant messaging systems to enable transmission and receipt of instant messages in near real time.

The call destination computer system 170 is configured to receive call notification and call screening messages and format data from the online service provider system 160, process the call notification and call screening messages in accordance with the format data to enable a user to perceive the call notification and call screening messages, accept user selection of options offered by the call notification and call screening messages, and send the option selection to the online service provider system 160. The call destination computer system 170 includes a device 170A capable of executing instructions under the command of a controller 170B. The device 170A may be a general purpose computer, such as a workstation or a personal computer, a PDA, a special purpose computer, an intelligent mobile phone, a pager, or a set top box.

The controller 170B commands and directs communications between the device 170A of the call destination computer system 170 and the online service provider system 160. The controller 170B may include one or more software or hardware applications that enable digital communications to be received from the online service provider system 160. For example, the controller 170B may be a modified instant messaging application configured to receive notification messages and send option selections in a manner similar to that used to receive instant messages and send instant messages. The device 170A is connected to the controller 170B by a wired, wireless or virtual (i.e., when the controller is software running on the device) data pathway 170C capable of delivering data.

Figure 2:
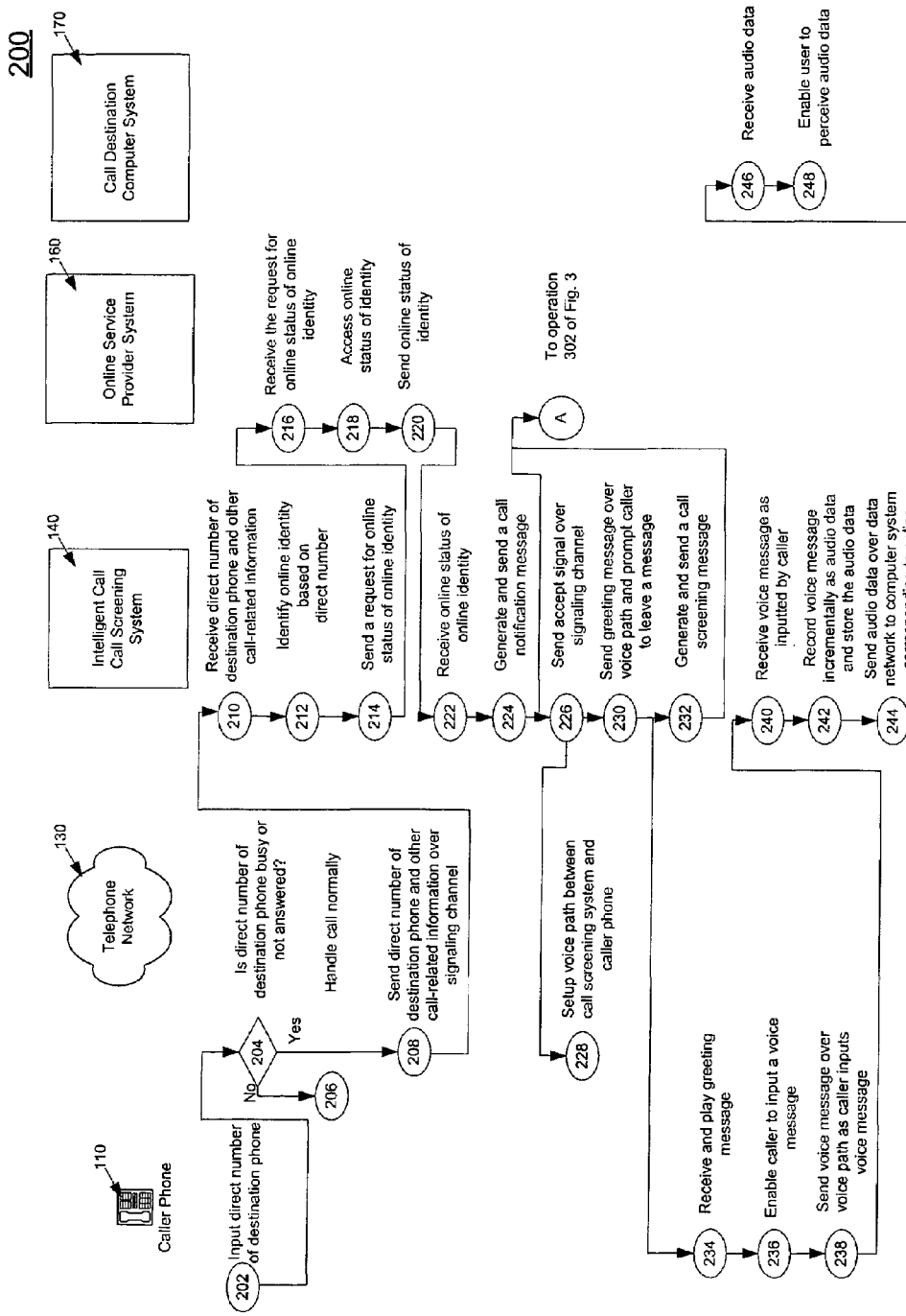
FIG. 2 is a flow chart illustrating a process for generating and delivering a call notification message, a call screening message and audio data used for call screening.

FIG. 2 shows a process 200 for generating and delivering a call notification message, a call screening message, and audio data used for call screening. For convenience, particular components described with respect to FIG. 1 are referenced as performing the process 200. However, similar methodologies may be applied in other implementations where different components are used to define the structure of the system, or where the functionality is distributed differently among the components shown by FIG. 1.

The user of the caller phone 110 inputs the direct number of the call destination phone 120 (202). The telephone network 130 determines whether the direct number of the call destination phone 120 is busy or not answered after a predetermined number of rings (204) or otherwise directed to ICSS 140. If the direct number of the call destination phone is answered, no call screening is necessary, and the telephone network 130 handles the call normally (206).

If the direct number of the call destination phone 120 is busy or not answered after a predetermined number of rings or otherwise directed to ICSS 140, the telephone network 130 sends the call destination phone direct number and other call-related information over a signaling channel to the ICSS 140 (208). The ICSS 140 receives the direct number of the call destination phone 120 and the other call-related information (210) and, after determining that the direct number of the call destination phone 120 is registered for call screening service, identifies an online identity associated with the direct number of the call destination phone 120 (212). The online identity may be identified, for example, by accessing an account record stored in a configuration or registration data store and indexed by direct number of call destination phone 120.

The ICSS 140 sends a request to the online service provider system 160 for the online status of the online identity (214). The online service provider system 160 receives the request for the online status of the online identity (216) and accesses the online status of the online identity (218). The online status of the online identity may be stored, for example, in a presence data store that is regularly updated in near real time in a manner similar to that used in instant messaging systems to reflect activity of a user at the call destination computer system 170. The online service provider system 160 sends the online status of the online identity to the ICSS 140 (220).

The ICSS 140 receives the online status of the online identity (222) and generates and sends a call notification message to the online service provider system 160 if the online identity is online (224). The options presented in the call notification message may be set as a default, or they may be determined based on the call screening preferences stored for the online identity or a class of the online identity. The process 200 proceeds to operations 302–318 of FIG. 3 which enable the user of the call destination computer system 170 to react to the call by selecting an option in the call notification message.

Figure 3:
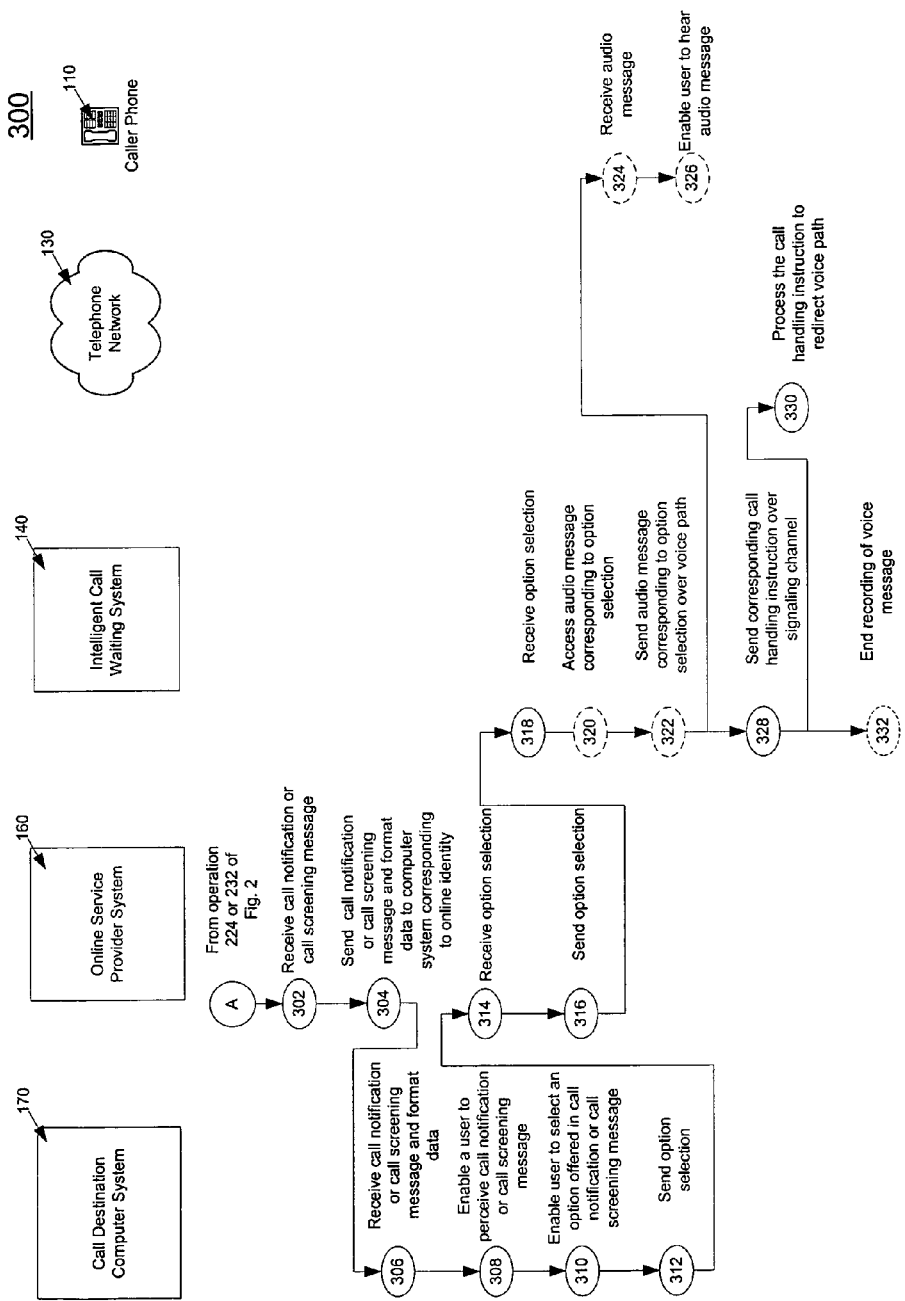
FIG. 3 is a flow chart illustrating a process for responding to a user selection of a call screening option in a call notification or call screening message.

If the option selection received from the call destination computer system 170 does not correspond to taking a message (e.g., the option selection corresponds to ignoring the call, taking the call or redirecting the call to another number), the process 200 proceeds to operations 320–330 of FIG. 3. However, if the option selection received from the call destination computer system 170 corresponds to taking a message, the ICSS 140 sends an accept signal over the signaling channel to the telephone network 130 (226). In response to the accept signal, the telephone network 130 sets up a voice path between the caller phone 110 and the ICSS 140 (228). The ICSS 140 accesses and sends a greeting message associated with the online identity over the voice path and prompts the caller to leave a message (230). The greeting message may be accessed, for example, by accessing a greeting message identifier from the account record and using the greeting message identifier to access the greeting message stored in a message data store.

The ICSS 140 generates and sends a call screening message to the online service provider system 160 (232). The process 200 proceeds to operations 302–332 of FIG. 3 which enable the user of the call destination computer system 170 to react to the call by selecting an option in the call screening message. Meanwhile, the caller phone 110 receives and plays the greeting message (234). The caller phone 110 enables the caller to begin inputting a voice message (236), which is sent by the caller phone 110 over a voice path across the telephone network 130 to the ICSS 140 (238). The ICSS 140 begins receiving the voice message (240) and records the voice message incrementally as a stream of discrete chunks of audio data as the voice message is received. The stream of audio data is copied and stored by the ICSS 140 (242). The stream of audio data is also sent by the ICSS 140 over the data network 150 to the call destination computer system 170 (244). The call destination computer system 170 receives the stream of audio data (246), reassembles the discrete chunks of audio data, and converts the audio data to audio to enable the user of the call destination computer system 170 to hear the voice message as the voice message is being received and stored by the ICSS 140 (248). Accordingly, the user of the call destination computer system 170 may react to the call by selecting an option in the call screening message while concurrently listening to the voice message.

FIG. 3 shows a process 300 for responding to a user selection of a call screening option in a call notification or call screening message. For convenience, particular components described with respect to FIG. 1 are referenced as performing the process 300. However, similar methodologies may be applied in other implementations where different components are used to define the structure of the system, or where the functionality is distributed differently among the components shown by FIG. 1.

The online service provider system 160 receives the call notification or call screening message for the online identity (assuming the online identity is online) (302) and sends the call notification or call screening message along with format data to the call destination computer system 170 corresponding to the online identity (304). The online service provider system 160 is configured to perform operations 302 and 304 in near real time to minimize transmission delays.

The call destination computer system 170 receives the call notification or call screening message and format data (306) and enables a user to perceive the call notification or call screening message (308). In one implementation, the call destination computer system 170 enables the user to perceive the call notification or call screening message as a pop-up window or a dialog box that appears on a visual display of the call destination computer system 170.

The call destination computer system 170 enables a user to select an option offered in the call notification or call screening message (310). The call destination computer system 170 sends the option selection to the online service provider system 160 (312).

The online service provider system 160 receives the option selection (314) and sends the option selection to the ICSS 140 (316). The online service provider system 160 is configured to receive and send the option selection to the ICSS 140 in near real time.

The ICSS 140 receives the option selection (318). Process 300 assumes that the option selection corresponds to accepting or redirecting the call. However, if the option selection corresponds to refusing the call and is in response to a call notification message, the ICSS 140 does not accept the call (i.e., allows it to continue ringing). If the option selection corresponds to refusing or ignoring the call and is in response to a call screening message, the ICSS 140 stops recording the call, disconnects the call, and in some implementations, deletes the audio file that stores the incomplete voice message. In some implementations, a call screening message may include the option to discard the message being deposited by the caller. Selection of this option results in the ICSS 140 no longer sending the audio data stream to the call destination computer system 170 and deleting the partially stored voice message.

As shown in process 300, if the option selection corresponds to accepting the call or forwarding the call to another phone number, the ICSS 140, in some implementations, accesses a stored outbound audio message corresponding to the option selection (330) and sends the outbound audio message corresponding to the option selection over the voice path to the caller phone 110 (322). The caller phone 110 receives the outbound audio message (324) and enables a user to hear the audio message (326). For example, the outbound audio message may be: "The phone you are calling is busy. Please stay on the line and you will be transferred to an alternative number" or "At the direction of the call recipient, your call is being forwarded." An audio identifier for the outbound audio message or a pointer to the audio identifier may be included in the received option selection. The ICSS 140 may access the outbound audio message based on the audio identifier from a local or remote data store communicatively coupled to the ICSS 140.

The ICSS 140 identifies the call handling instruction associated with the option selection and sends the call handling instruction to the telephone network 130 over the signaling channel (328). The telephone network 130 processes the call handling instruction by forwarding or redirecting the voice path accordingly (330). For example, the option selection may include a forwarding telephone number input by the call recipient (e.g., a user inputs a phone number convenient to them while using the computer to which the call notification was sent, or the phone number of another user to whom they wish to have the call redirected, such as their secretary) or a pointer used to access the forwarding telephone number from a data store based on input by the call recipient or information known about the call recipient (e.g., if they respond using, their cell phone, the cell phone number may be assigned as the forwarding number). The forwarding telephone number is included in the call handling instruction which is sent to the telephone network over the signaling channel and which is processed by the telephone network to redirect the call destination from the ICSS 140 to the phone line corresponding to the forwarding telephone number.

After sending the call handling instruction to the telephone network 130 and, in some implementations, sending an outbound audio message to the caller phone 110 in response to selection of an option in a call screening message, the ICSS 140 ends the recording of the voice message, stops sending the stream of audio data to the call destination computer system 170, and closes the audio file in which the copy of the audio data stream was being stored (324). The audio file may then be subsequently accessed by the call recipient to hear the incomplete voice message.

Figure 4:
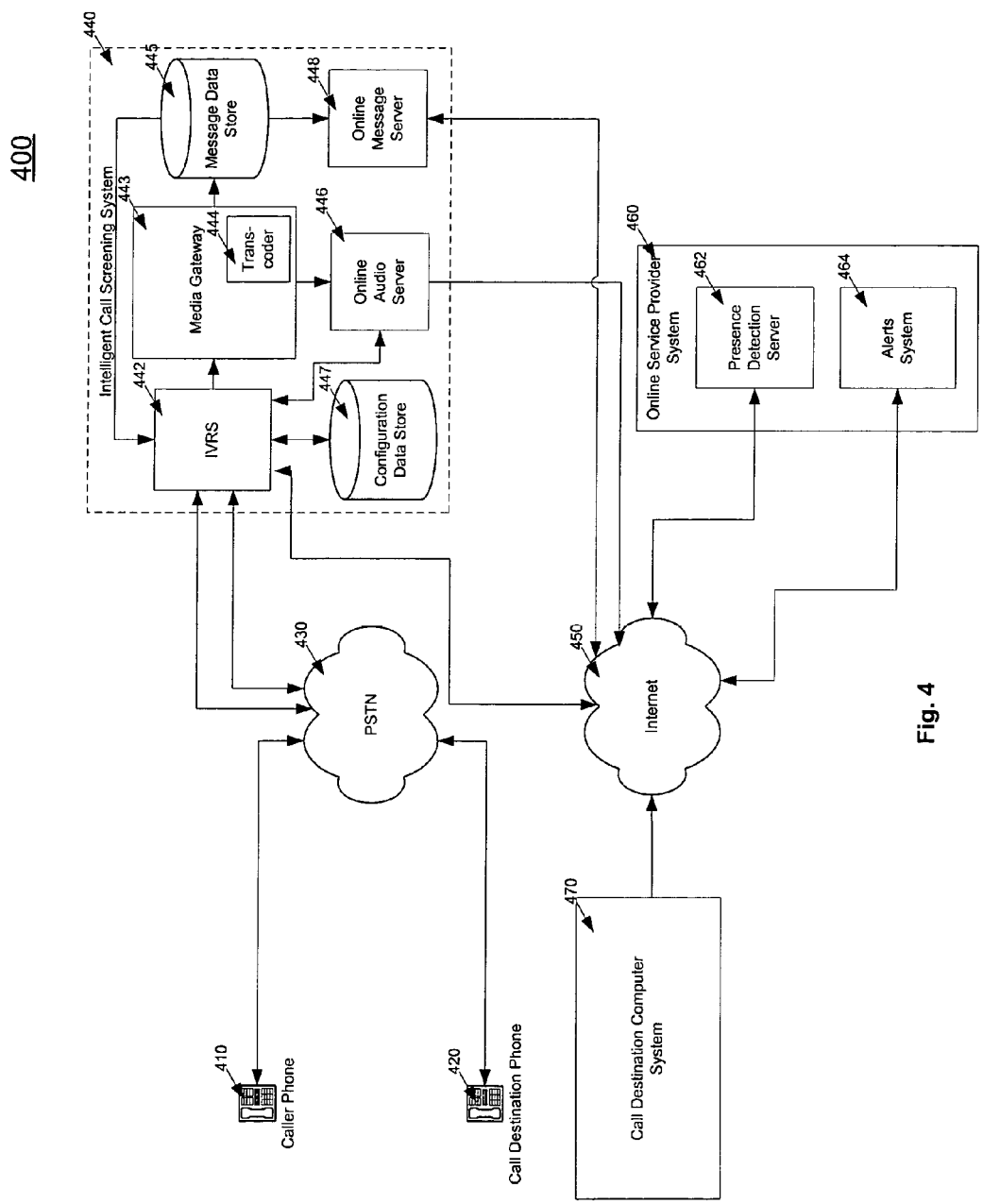
FIG. 4 is a block diagram of an exemplary implementation of the communications system of FIG. 1 used for screening traditional telephony calls.
Figure 5A:
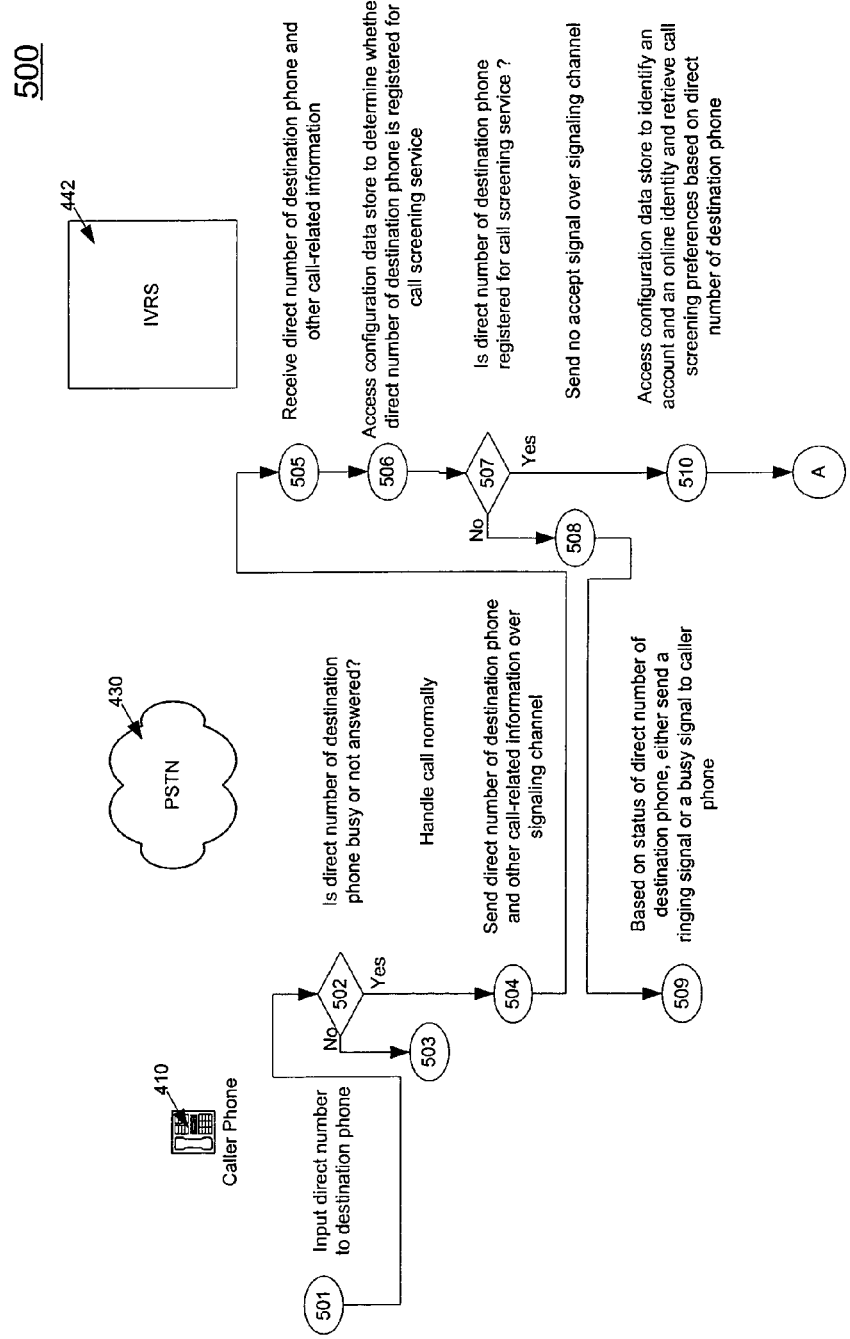
FIGS. 5A–5D are flow charts illustrating a process for generating and delivering a call notification message, a call screening message, and audio data used for call screening.
Figure 5B:
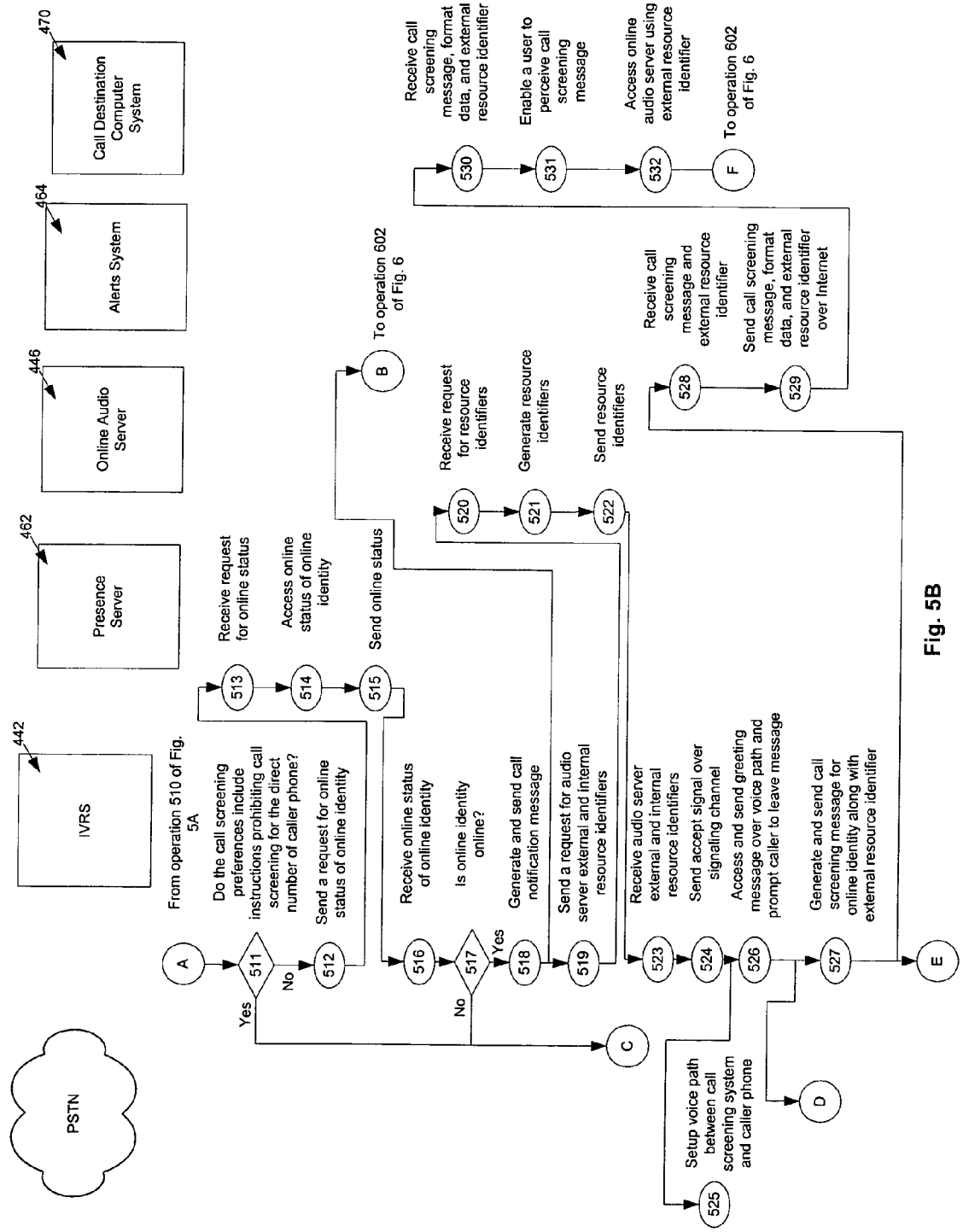
Figure 5C:
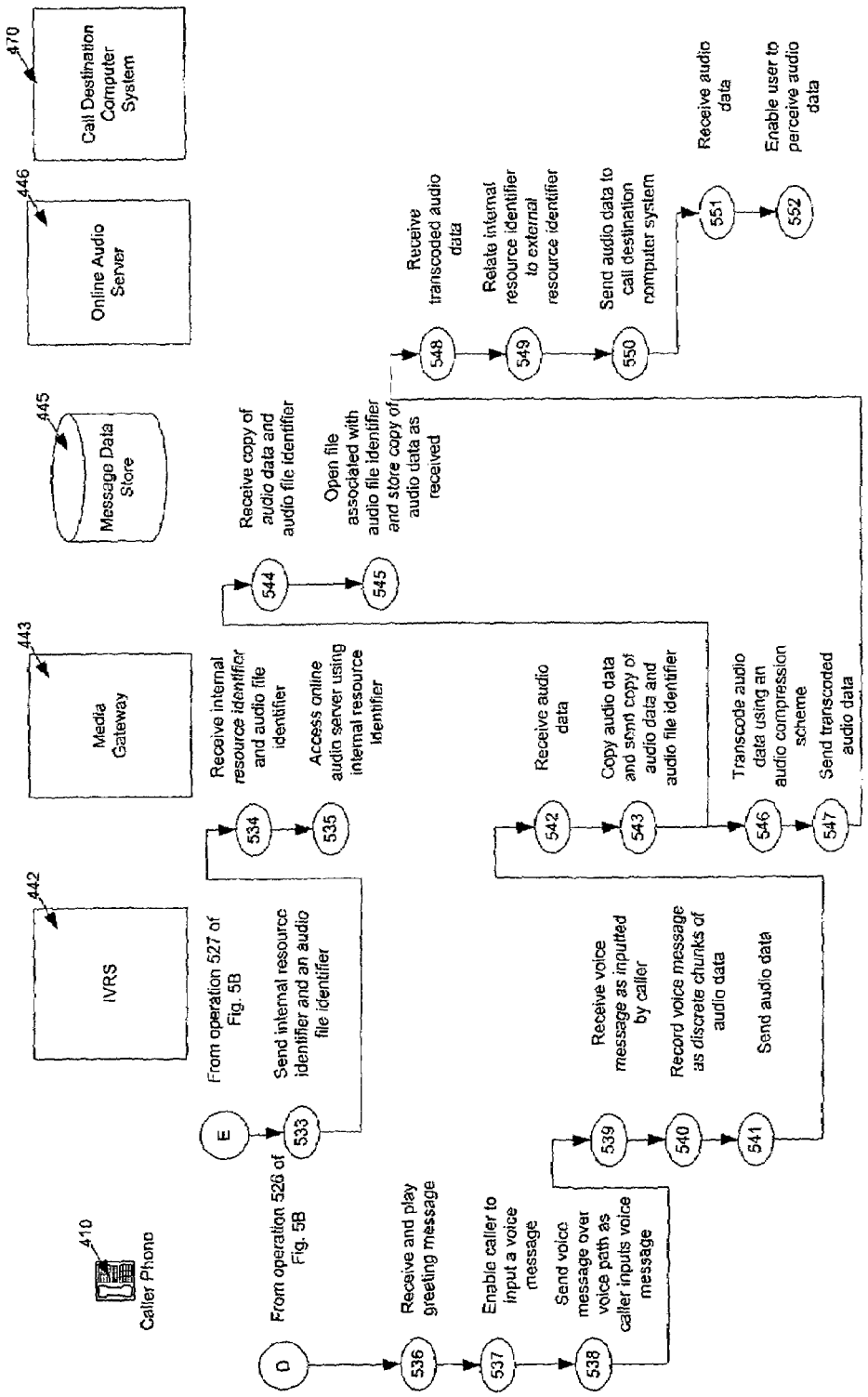
Figure 5D:
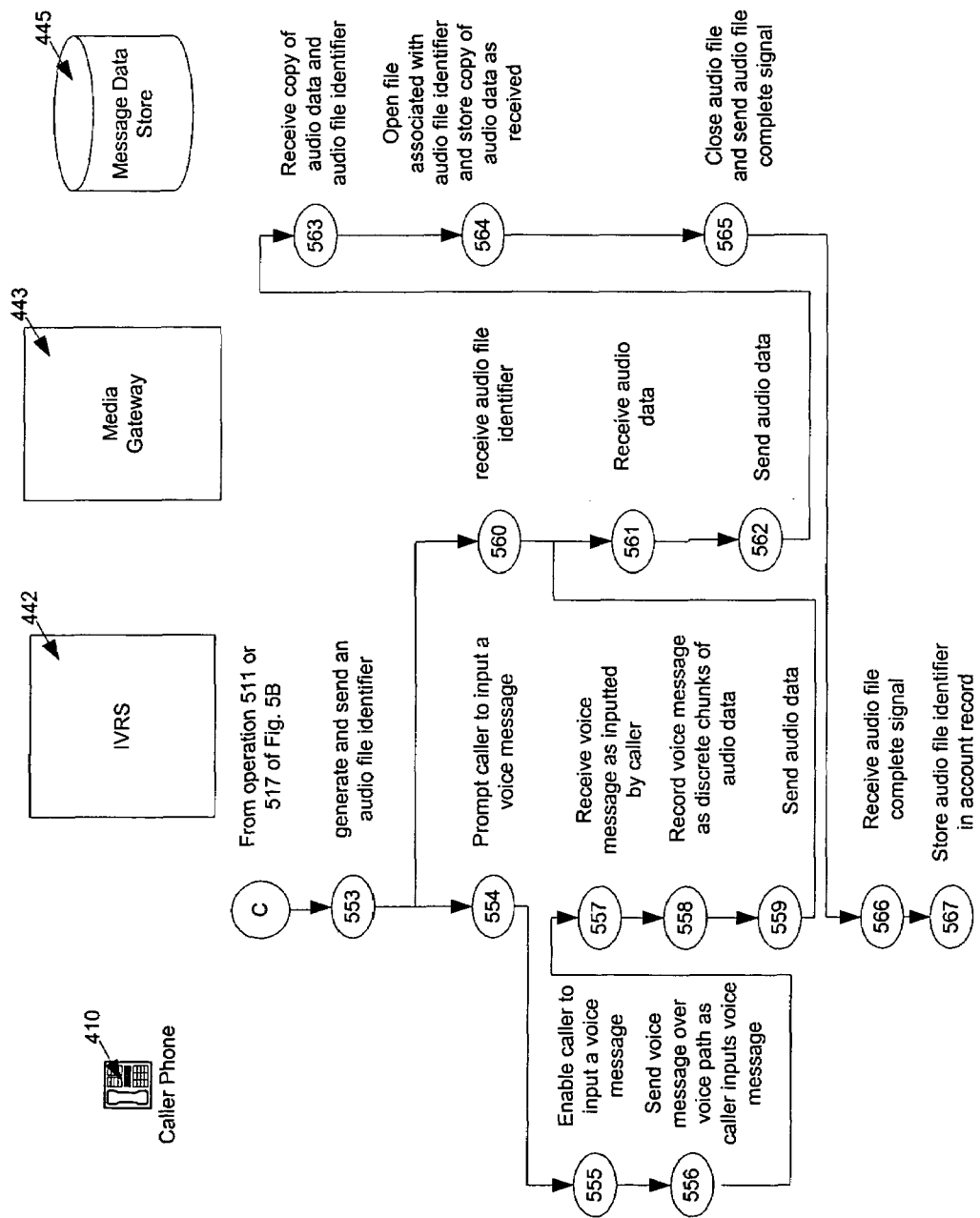

FIG. 4 shows one exemplary implementation 400 of the communications system 100 of FIG. 1 configured to provide screening of traditional telephone calls. The communications system 400 includes a caller phone 410, a call destination phone 420, an ICSS 440, an online service provider system 460, and a call destination computer system 470. In this implementation, the voice path of the call that is screened traverses a PSTN 430, and the screening audio data stream traverses the Internet 450.

Examples of several elements within the communications system 400 of FIG. 4 are described broadly above with respect to FIG. 1. In particular, the caller phone 410, the call destination phone 420, and the call destination computer system 470 typically have attributes comparable to those described with respect to the caller phone 110, the call destination phone 120, and the call destination computer system 170 of FIG. 1, respectively. Likewise, the ICSS 440 and the online service provider system 460 typically have attributes comparable to and may illustrate one possible implementation of the ICSS 140 and the online service provider system 160 of FIG. 1.

The ICSS 440 includes an interactive voice response system (IVRS) 442, a media gateway 443, a message data store 445, an online audio server 446, a configuration data store 447, and an online message server 448.

The IVRS 442 is a telephony-facing and IP-facing computer system configured to receive a call from the caller phone 410, validate the call, and, if the call destination receives call screening service, send a greeting message to the caller phone 410 prior to prompting the caller to leave a voice message. The IVRS 442 validates the call by accessing the configuration data store 447 and determining whether an active account exists that corresponds to the direct number of the call destination. Before or while the greeting message is playing, the IVRS 442 requests from the online service provider system 460 the online status of an online identity associated with the active account.

If the online identity is presently online, the IVRS 442 requests an internal and an external resource identifier from the online audio server 446. Each resource identifier may be, for example, a universal resource locator (URL). The IVRS 442 sends the internal resource identifier and an audio file identifier to the media gateway 443 which uses the internal resource identifier to establish a connection with the online audio server 446 and uses the audio file identifier to identify the audio file in the message data store 445 in which the voice message of the caller will be stored. If the online identity is not online, the IVRS 442 does not request resource identifiers from the online audio server 446 but still sends an audio file identifier to the media gateway 443.

If the online identity is online, the IVRS 442 also is configured to generate and send a call notification message and a call screening message along with the external resource identifier to the online service provider system 460 for delivery to the call destination computer system 470. The external resource identifier is used by the call destination computer system 470 to establish a connection with the online audio server 446. Once the IVRS 442 sends the audio file identifier and, if applicable, sends the call screening message and the internal and external resource identifiers, the IVRS 442 prompts the caller to leave a voice message.

The IVRS 442 records the voice message incrementally as discrete chunks of audio data. The size of the chunks of audio data may be chosen to enhance or optimize the balance between latency and system throughput. Smaller chunks result in smaller latency but also result in decreased system throughput. A typical chunk size is approximately 0.5 seconds of recorded audio data. The chunks of audio data are packet zed and sent as a stream to the media gateway 443 using, for example, an IP-based protocol.

If the online identity is online, the IVRS 442 is configured to receive an option selection from the call destination computer system 470 through the online service provider system 460 and send a call handling instruction and, in some implementations, an outbound audio message corresponding to the received option selection to the caller phone 410 through the PSTN. The call handling instruction may include, for example, accepting the call, rejecting the call, and redirecting the call.

The media gateway 443 is a computer system configured to receive a stream of audio data corresponding to a voice message from the IVRS 442 and, if the online identity is online, transcode the stream of audio data using a transcoder 444 and send the transcoded stream of audio data to the online audio server 446. The media gateway 443 also copies the stream of audio data and sends the audio file identifier received from the IVRS 442 and the copy of the stream to the message data store 445 for storage in a file identified by the audio file identifier. If the online identity is online, the stream of audio data typically is received by the media gateway 443 after the media gateway 443 has established a connection with the online audio server 446 using the internal resource identifier.

The transcoder 444 of the media gateway 443 transcodes the original stream of audio data using an audio compression scheme such as, for example, MPEG Layer III Audio (MP3). Transcoding the stream of audio data decreases the transmission time across the Internet and enables the audio data stream to be received by the call destination computer system 470 in near real time.

The message data store 445 is a storage device that is communicatively coupled to the IVRS 442, the media gateway 443, and the online message server 448. The message data store 445 stores greeting messages and outbound messages of subscribers and also stores audio messages deposited by callers. The message data store 445 stores these messages in audio files corresponding to audio file identifiers received from the IVRS 442 or from the media gateway 443. The messages in the message data store 445 may be accessed by the IVRS 442 (e.g., the outbound messages and the greeting messages) and by the online message server 448 (e.g., the caller deposited messages). In other implementations, the files stored in the message data store 445 are sent or made accessible to an external voicemail or messaging system for access by users associated with the direct number of the call destination phone 120.

The online audio server 446 is a computer system configured to receive a stream of audio data from the media gateway 443 and relay the stream of audio data to the call destination computer system 470. The stream of audio data is received over a connection established between the online audio server 446 and the media gateway 443 and is delivered over a connection established between the online audio server 446 and the call destination computer system 470. The media gateway 443 uses an internal resource identifier to establish a connection with the online audio server 446, and the call destination computer system 470 uses an external resource identifier to establish a connection across the Internet with the online audio server 446. The resource identifiers are generated by the online audio server 446 at the request of the IVRS 442 and are delivered to the media gateway 443 and to the call destination computer system 470 by the IVRS 442.

Typically, both connections are setup prior to the online audio server 446 receiving the stream of audio data from the media gateway 443. When the online audio server 446 receives the stream of audio data, the online audio server 446 relates the internal resource identifier associated with the connection between the online audio server 446 and the media gateway 443 to an external resource identifier associated with a connection between the online audio server 446 and the call destination computer system 470. The online audio server 446 relays the stream across the Internet to the call destination computer system 470 over the connection that is identified as being established using the related external resource identifier.

The configuration data store 447 is a data storage device that stores account records and that is communicatively coupled to the IVRS 442. The account records store the online identity, the call screening preferences, and the audio file identifiers for each call screening subscriber account. The audio file identifiers include identifiers for the audio files storing outbound voice messages, greeting messages, and deposited voice messages. The account records may be indexed by subscriber phone number (i.e., the direct number of the call destination phone 420).

The online message server 448 is a computer system configured to enable a user of the call destination computer system 470 to access or retrieve the messages stored in the message data store 445 across the Internet. In one implementation, the online message server 448 is an e-mail system configured to enable access to e-mails with audio file attachments. In this case, the audio file attachments are the voice message audio files stored in the message data store 445.

A user may access the voice messages stored in the message data store 445 by using the call destination computer system 470 to communicate with the online message server 448 across the Internet. Additionally or alternatively, the user may use a telephone to call the IVRS 442 over the PSTN to access voice messages stored in the message data store 445.

The online service provider system 460 includes a presence server 462 and an alerts system 464.

The presence server 462 is a server that receives, updates, and publishes online presence data for each identity. The presence server 462 enables the IVRS 442 to access online status data for particular online identities. In one implementation, the presence server 462 is functionally similar to the central server in an instant messaging system that receives periodic online status updates from call destination computer systems 470. In another implementation, the presence server 462 is functionally similar to the presence detection system disclosed in application Ser. No. 10/414,167 that receives communication device status data and user availability to perceive communications data from a device monitor coupled to the device 470B of the call destination computer system 470. In this implementation, the IVRS 442 includes the functionality of a device monitoring system.

The alerts system 464 is a computer system configured to enable near real time transmission of call notification and call screening messages to call destination computer systems 470 from the IVRS 442 and transmission of the option selections from call destination computer systems 470 to the IVRS 442. The alerts system 464 may be configured to provide this functionality in a manner similar to that used by instant messaging systems, or even to leverage instant messaging systems to enable transmission and receipt of instant messages in near real time.

FIGS. 5A–5D show a process 500 for generating and delivering a call notification message, a call screening message, and audio data used for call screening. For convenience, particular components described with respect to FIG. 4 are referenced as performing the process 500. However, similar methodologies may be applied in other implementations where different components are used to define the structure of the system, or where the functionality is distributed differently among the components shown by FIG. 4.

The user of the caller phone 410 inputs the direct number of the call destination phone 420 (501). The PSTN determines whether the direct number of the call destination phone 420 is busy or not answered after a predetermined number of rings (502) or if the call should otherwise be directed to IVRS 442. If the direct number of the call destination phone 420 is not busy and is answered before a predetermined number of rings, no call screening is necessary, and the PSTN handles the call normally by completing the call setup between the caller phone 410 and the call destination phone 420 (503).

If the direct number of the call destination phone 420 is busy or is not answered after a predetermined number of rings or is otherwise directed to IVRS 442, the PSTN sends the call destination phone direct number and other call-related information over a signaling channel to the IVRS 442 (504). The IVRS 442 receives the direct number of the call destination phone 420 and the other call-related information (505) and accesses the configuration data store 447 (506).

The IVRS 442 uses the direct number of the call destination phone 420 to access appropriate account records stored in the configuration data store 447 to determine whether the direct number of the call destination phone 420 is registered for call screening service (507). If the direct number of the call destination phone 420 is not registered for call screening service, the IVRS 442 sends a no accept signal over the signaling channel to the PSTN (508) and sends a busy signal or a ringing signal to the caller phone 410 in accordance with the status of the direct number of the call destination phone 420 (509).

If the direct number of the call destination phone 420 is registered for call screening service, the IVRS 442 accesses the configuration data store 447 to identify an account based on the direct number of the call destination phone 420 and to retrieve an online identity and call screening preferences associated with the account (510). In one implementation example, an account record is indexed by the direct number of the call destination phone 420 and contains call screening preferences, an associated online identity, a greeting message audio file identifier, outbound audio file identifiers, and deposited voice message audio file identifiers.

The IVRS 442 determines whether the call screening preferences include instructions prohibiting call screening for the direct number of the caller phone 410 (511). If the call screening preferences include instructions prohibiting call screening for the direct number of the caller phone 410, process 500 proceeds to operations 553–567.

If the call screening preferences do not include instructions prohibiting call screening for the direct number of the caller phone 410, the IVRS 442 sends a request for the online status of the online identity to the presence server 462 (512). The presence server 462 receives the request for the online status (513) and accesses the online status of the online identity from a data store (514). The presence server 462 sends the online status of the online identity to the IVRS 442 (515).

The IVRS 442 receives the online status of the online identity (516) and determines whether the online identity is online (517). If the online identity is not online, process 500 proceeds to operations 553–567. If the online identity is online, the IVRS 442 generates and sends a call notification message based on the call screening preferences (518). Process 500 proceeds to operations 602–618 of FIG. 6 which enable the user of the call destination computer system 170 to react to the call by selecting an option in the call notification message.

Figure 6:
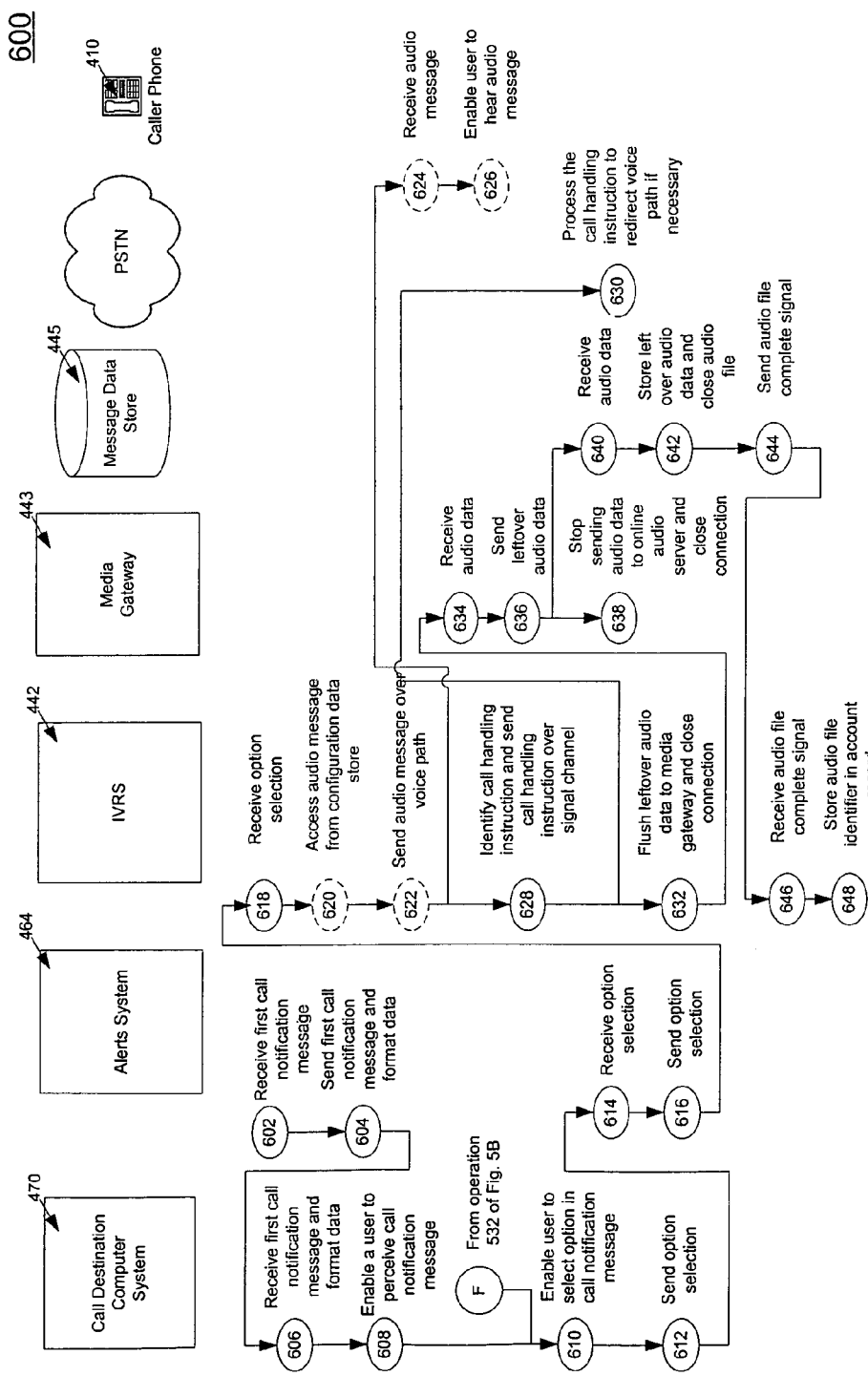
FIG. 6 is a flow chart illustrating a process for responding to a user selection of a call screening option in a call notification or call screening message.

If the option selection received from the call destination computer system 170 does not correspond to taking a message (e.g., the option selection corresponds to ignoring the call, taking the call, or redirecting the call to another number), the process 200 proceeds to operations 620–628 of FIG. 6. However, if the option selection received from the call destination computer system 170 corresponds to taking a message, the IVRS 442 generates and sends a request for audio server external and internal resource identifiers to the online audio server 446 (519). The online audio server 446 receives the request for resource identifiers (520), generates the internal and external resource identifiers (521), and sends the resource identifiers to the IVRS 442 (522).

The IVRS 442 receives the audio server internal and external resource identifiers (523) and sends an accept signal over the signaling channel to the PSTN (524). In response to the accept signal, the PSTN sets up a voice path between the caller phone 410 and the IVRS 442 (525).

The IVRS 442 accesses and sends a greeting message over the voice path and prompts the caller to leave a message (526). For example, the IVRS 442 may access a greeting message audio file identifier associated with the direct number of the call destination phone 420 from the account record stored in the configuration data store 447. The IVRS 442 may access the message data store 445 using the greeting message audio file identifier to retrieve a greeting message associated with the account. The process 500 may proceed to operations 540–555 which enable the caller to input a voice message, which is recorded and streamed as audio data to the call destination computer system 470.

Meanwhile, the IVRS 442 generates a call screening message for the online identity based on the call screening preferences and sends the call screening message and the external resource identifier to the alerts system 464 (527). The alerts system 464 receives the call screening message for the online identity and the external resource identifier (528) and sends the call screening message along with format data and the external resource identifier to the call destination computer system 470 corresponding to the online identity (529). The receiving of the call screening message and external resource identifier and sending of the call screening message, external resource identifier, and format data is performed in near real time.

The call destination computer system 470 receives the call screening message, external resource identifier, and format data (530) and enables a user to perceive the call screening message (531). In one implementation, the call destination computer system 470 enables the user to perceive the call notification message as a pop-up window or dialog box that appears on a visual display of the call destination computer system 470. The call destination computer system 470 also establishes a connection with the online audio server 446 using the external resource identifier (532). Process 500 proceeds to operations 610–648 of FIG. 6 which enable the user of the call destination computer system 170 to react to the call by selecting an option in the call screening message.

The IVRS 442 sends an internal resource identifier and an audio file identifier to the media gateway 443 (533). The media gateway 443 receives the internal resource identifier and audio file identifier (534) and accesses the online audio server 446 using the internal resource identifier (535).

The IVRS 442 receives and plays a greeting message and prompts the caller to input a voice message (536), and the caller phone 410 enables the caller to input a voice message (537). The caller phone 410 sends the voice message over the voice path as the caller inputs the voice message (538). The IVRS 442 receives the voice message as inputted by the caller (539) and records the voice message as discrete chunks of audio data (540). The IVRS 442 sends the audio data as a data stream to the media gateway 443 (541).

The media gateway 443 receives the stream of audio data (542), copies the stream of audio data, one stream for storage and the other for streaming to the user, and sends the audio file identifier and the copy of the stream of audio data to the message data store 445 (543). The message data store receives the audio file identifier and a copy of the stream of audio data (544). The message data store 445 opens a file associated with the audio file identifier and stores the audio data incrementally as the stream of audio data is received from the media gateway 443 (545).

The media gateway 443 transcodes the stream of audio data using an audio compression scheme such as, for example, MP3 (546) and sends the transcoded audio data stream to the online audio server 446 (547). The online audio server 446 receives the transcoded audio data stream (548) and relates the internal resource identifier to the external resource identifier (549). The online audio server 446 sends the transcoded audio data to the call destination computer system 470 over the connection established between the call destination computer system 470 and the online audio server 446 in operation 534 (550). The call destination computer system 470 receives the audio data (551) and enables a user to perceive the audio data (552). In one implementation example, the call destination computer system 470 enables a user to perceive the audio data by converting the audio data to audio.

If the call screening preferences include instructions prohibiting call screening for the direct number of the caller phone or, alternatively, if the online identity associated with the direct number of the call destination phone is not online, the IVRS 442 generates and sends an audio file identifier to the media gateway 443 (553).

The IVRS 442 prompts the caller to input a voice message (554), and the caller phone 410 enables the caller to input a voice message (555). The caller phone 410 sends the voice message over the voice path as the caller inputs the voice message (556). The IVRS 442 receives the voice message as inputted by the caller (557) and records the voice message as discrete chunks of audio data (558). The IVRS 442 sends the audio data as a data stream to the media gateway 443 (559).

The media gateway 443 receives the audio file identifier (560) and receives the stream of audio data (561) and sends the audio file identifier and the stream of audio data to the message data store 445 (562). The message data store receives the audio file identifier and the stream of audio data (563). The message data store 445 opens a file associated with the audio file identifier and stores the audio data incrementally as the stream of audio data is received from the media gateway 443 (564). When the voice message is complete and the stream of audio data stops, the message data store 445 closes the audio file and sends an audio file complete signal to the IVRS 442 (565). The IVRS 442 receives the audio file complete signal (566) and stores the audio file identifier in the account record in the configuration data store 447 associated with the direct number of the call destination phone 420 (567). In some implementations, the IVRS 442 also sends a voice message complete signal to the call destination computer system 470, which closes or otherwise disables the call notification message and may additionally inform the caller that the voice message deposit is complete.

The account record containing the audio file identifiers of deposited voice messages for a given account may be subsequently accessed by the online message server 448 or by an external voicemail or unified messaging system to retrieve the audio file identifiers. The audio file identifiers may then be used to access the deposited voice messages in the message data store 445 associated with the account. The IVRS 442 also may access the account record to retrieve deposited voice messages associated with the account.

FIG. 6 shows a process 600 for responding to a user selection of an option in a call notification or call screening message. For convenience, particular components described with respect to FIG. 4 are referenced as performing the process 600. However, similar methodologies may be applied in other implementations where different components are used to define the structure of the system, or where the functionality is distributed differently among the components shown by FIG. 4.

The alerts system 464 receives a call notification message for the online identity (602) and sends the call notification message along with format data to the call destination computer system 470 corresponding to the online identity (604). The receiving of the call notification message and sending of the call notification message and format data is performed in near real time.

The call destination computer system 470 receives the call notification message and format data (606) and enables a user to perceive the call screening message (608). In one implementation, the call destination computer system 470 enables the user to perceive the call notification message as a pop-up window or dialog box that appears on a visual display of the call destination computer system 470

The call destination computer system 470 enables a user to select an option offered in the call notification message prior to a predetermined time interval or, in the case of an option offered in a call screening message, prior to completion of the deposit of the voice message by the caller (610). The call destination computer system 470 sends the option selection to the alerts system 464 (612).

The alerts system 464 receives the option selection (614) and sends the option selection to the IVRS 442 (616). The alerts system 464 is configured to receive and send the option selection to the IVRS 442 in near real time.

The IVRS 442 receives the option selection (618). Some option selections correspond to selection of an outbound voice or audio message. If the option selection corresponds to selection of an outbound audio message, the IVRS 442 accesses the outbound audio message from the message data store 445 using the appropriate outbound audio message identifier (620) and sends the outbound audio message to the caller phone 410 over the voice path (622). The caller phone 410 receives the outbound audio message (624) and enables a user to hear the outbound audio message (626).

The IVRS 442 also identifies a call handling instruction corresponding to the option selection and sends the call handling instruction over the signal channel to the PSTN (628). The PSTN processes the call handling instruction and forwards or redirects the voice path accordingly (630). The call handling instruction may include the direct number of the redirected call destination.

If the option selection is offered in a call screening message and corresponds to a call handling instruction that interrupts the deposit of the voice message, the IVRS 442 flushes any left over audio data to the media gateway 143 prior to closing the connection between the IVRS 142 and the media gateway 143 (632). The media gateway 143 receives the last audio data from the IVRS 142(634) and sends a copy of the audio data along with a copy of any left over audio data within the media gateway 143 to the message data store 145 (636). The media gateway 443 also stops sending audio data to the online audio server 446 and closes the connection between the media gateway 443 and the online audio server 446 (638).

The message data store 445 receives the audio data (640), stores the audio data, and closes the audio file (642). The message data store 445 sends an audio file complete signal (644) to the IVRS 442. The IVRS 442 receives the audio file complete signal (646) and stores the audio file identifier in the account record corresponding to the direct number of the call destination phone 420 (648). The partial voice message is thus stored in the message data store 445 and available for subsequent retrieval and playback.

Figure 7:
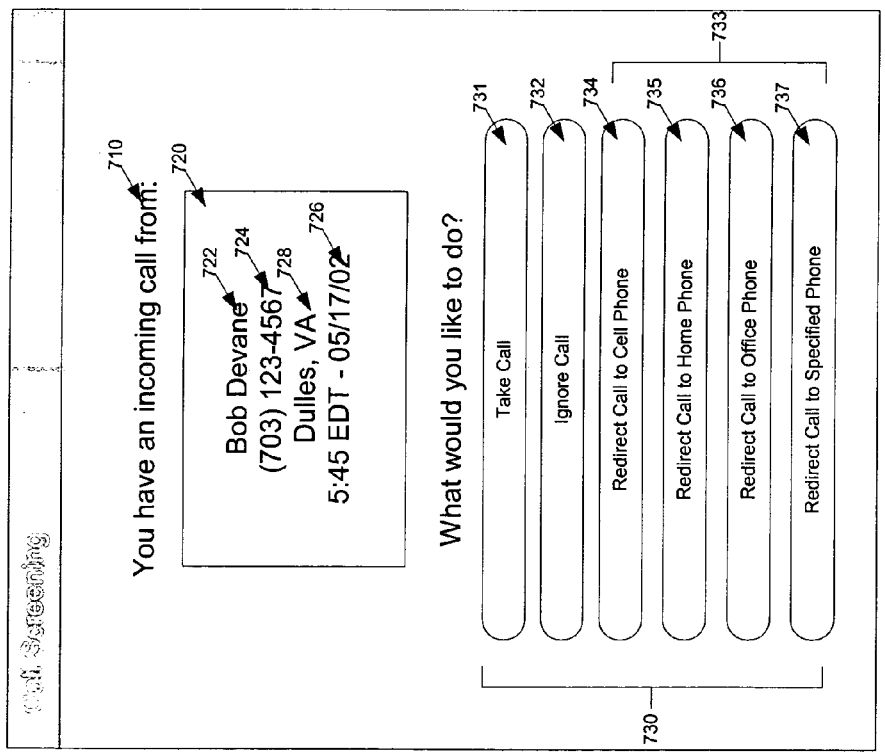
FIG. 7 is a user interface generated in response to receipt of a call screening message.

FIG. 7 shows a user interface 700 that may be presented to the user by the call destination computer system 170 upon receipt of a call screening message. The user interface 700 includes a statement 710 informing the user of the existence of an incoming call and includes caller-related information 720. The caller-related information 720 may include the name of the caller 722 (e.g., Bob Jackson), the direct number of the caller phone 724 (e.g., (703) 123-4567), the time and date when the call was received 726 (e.g., 5:45 EDT on May 17, 2002), and other caller-related information 728 that may be determined based on the direct number of the caller phone 110. The other caller-related information 728 may include, for example, the geographic location of the caller (e.g., Dulles, Va.) and information stored in an address book or calendar that is accessible based on the direct number of the caller phone 110 (e.g., Meeting scheduled with Bob on Saturday Jul. 12, 2003). Such information may be stored locally at the call destination computer system 170 or may be accessible from a remote device across the data network 150.

The user interface 700 also includes a set of option buttons 730 that may be selected by the user to react to the call. The option buttons 730 may include, for example, an option button to take the call 731, an option button to ignore the call 732, and a set of call redirection buttons 733. The set of call redirection buttons 733 may include, for example, an option button to redirect the call to a cell phone 734, a home phone 735, an office phone 736, and/or a specified phone 737.

Selecting the option button to take the call 731 results in the call being redirected to the direct number of the call destination phone 120. Selecting the option button to ignore the call 732 closes or otherwise disables the user interface 700 and stops converting the audio data received from the ICSS 140 into audio. In another implementation, selecting the option button to ignore the call 732 does not close the user interface 700 but rather disables further selections of option buttons 730 while continuing to convert the audio data received from the ICSS 140 into audio. The user interface 700 may subsequently close when the audio message finishes.

Selecting the option button to redirect the call to a cell phone 734, a home phone 735, or an office phone 736 results in the call being redirected to a direct number of a cell phone, a home phone, or an office phone. The corresponding direct numbers are typically setup by the user when configuring their call screening preferences. Selecting the option button to redirect the call to a specified phone 737 enables the call recipient to specify the direct number to which the call should be redirected. For example, selection of the option button 737 may result in a pop-up window in which the call recipient may input the direct number of the specified phone. The direct number of the specified phone is sent by the call destination computer system 170 to the ICSS 140, and the ICSS 140 instructs the telephone network 130 to redirect the call accordingly.

In some implementations, an outbound audio message may be sent to the call destination phone 170 prior to carrying out the task associated with a selected option button. For example, selecting the take the call button 731 may result in an outbound audio message being sent to the caller prior to the call being redirected to the direct number of the call recipient. The audio message may be: "Please stay on the line. I will be picking up the phone shortly." The outbound audio message also may be chosen by the caller through, for example, a pop-up window after selecting one of the option buttons 730. For example, selecting the option button 734 to redirect the call to a cell phone may launch a pop-up window containing two different outbound audio messages that may be selected: (1) "Please stay on the line. Your call is being redirected to my cell phone"; and (2) "I am currently extremely busy. If this call is important, stay on the line and you will be redirected to my cell phone, otherwise, please hang up and I will call you back shortly."

The user interface 700 may vary depending on the capabilities of the call destination computer system 170 and the format data received from the online service provider system 160. As mentioned before, call destination computer systems 170 with more limited capabilities may provide less caller-related information 710 and less options 730 while call destination computer systems 170 with greater capabilities may provide more caller-related information 710 and more options 730.

A user interface that is similar to the user interface 700 may be generated by the call destination computer system 170 in response to receipt of a call notification message. The main difference between such a user interface is that the user interface 700 is presented when the user of the call destination computer system 170 is able to listen to a voice message being deposited. In contrast, the user interface for a call notification message is presented prior to the ICSS 140 accepting the call.

FIG. 8 shows a process 800 for screening a traditional telephony call from a calling party to a called party. A traditional telephony call is received over a telephone network (810). An audio message from the calling party is recorded as audio data (820). The audio data is transmitted across a data network to a computer of the called party while the calling party is leaving the audio message (830). In some implementations, the audio data is transcoded using an audio compression scheme prior to transmitting the transcoded audio data to the computer of the called party. The called party perceives the audio data before the called party finishes leaving the audio message (840). The called party typically perceives the audio data through conversion of the audio data into audio. The called party may react to the traditional telephony call in response to the audio message (850). For example, the called party may react to the traditional telephony call by ignoring the call, taking the call, or redirecting the call to another direct number. Additionally or alternatively, the called party may send an outbound audio message to the calling party.

A number of features have been described. Nevertheless, it will be understood that various modifications may be made. For example, the systems and processes refer to a voice path and a signaling channel. In some implementations, the voice path and the signaling channel are separated (i.e., out-of-band signaling). In other implementations, the voice path and the signaling channel are integrated into one channel (i.e., in-band signaling) that handles the transmission of audio data as well as the transmission of call handling data.

In another implementation, the call notification message is not used. Instead, the ICSS 140 automatically accepts the call from the caller phone 110, prompts the caller to leave a message, and generates and sends a call screening message to call destination computer systems 170 in the same manner as described previously. In yet another implementation, the call notification message is displayed visually by the call destination computer system 170 as, for example, a pop-up window. When the subsequent call screening message is received, the call destination computer system 170 updates selected portions of the pop-up window (e.g., the options presented in the pop-up window) to correspond to information related to the call screening message. In yet another implementation, the pop-up window corresponding to the call notification message is closed automatically after selection of an option by the user and a new pop-up window corresponding to the call screening message is presented to the user upon the call destination computer system 170 receiving the call screening message.

Accordingly, other features are within the scope of the following claims.

What is claimed is:

1. A method for screening a telephony call made by a calling party to a called party, the method comprising:
   receiving, over a telephone network, a telephony call from the calling party at a messaging service platform;
   receiving an audio message generated by the calling party as a first stream of audio data;
   establishing a connection with an online audio server;
   sending the first stream of audio data to the online audio server over the established connection;
   leveraging an internal resource identifier to enable identification of the first stream of audio data at the online audio server;
   relating the internal resource identifier to an external resource identifier;
   sending the external resource identifier to a client system;
   enabling the client system to establish a connection with the online audio server;
   receiving an indication of the external resource identifier from the client;
   using the received indication of the external resource identifier and its relationship to the internal resource identifier to enable identification of the first stream of audio data; and
   sending the first stream of audio data to the client system over the connection established between the client system and the online audio server.

2. The method of claim 1, wherein sending the first stream of audio data to the client system occurs before receipt of the complete audio message at the messaging service platform.

3. The method of claim 1, wherein sending the first stream of audio data to the client system occurs before the call originated by the calling party terminates.

4. The method of claim 1, wherein at least one of the internal resource identifier arid the external resource identifier is a universal resource locator.

5. The method of claim 1, wherein the external resource identifier is a universal resource locator and enabling the client to establish a connection with the online audio server comprises enabling the client to establish a connection with the online audio server by using the universal resource locator.

6. The method of claim 1, wherein relating the internal resource identifier to the external resource identifier comprises relating the internal resource identifier to the external resource identifier at the online audio server.

7. The method of claim 1, wherein relating the internal resource identifier to the external resource identifier comprises relating the internal resource identifier to the external resource identifier at an interactive voice response system from which audio data is sent.

8. The method of claim 1, wherein relating the internal resource identifier to the external resource identifier comprises relating the resource identifiers in accordance with a relationship defined by an interactive voice response system.

9. The method of claim 1, further comprising copying the first stream of audio data substantially simultaneously to the receiving of the audio message to generate a second stream of audio data.

10. The method of claim 9, further comprising storing the second stream of audio data in a message store substantially simultaneously to the receiving of the audio message.

11. The method of claim 1, wherein receiving an audio message from the calling party comprises recording the audio message at an interactive voice response system that receives the call.

12. The method of claim 11, further comprising generating an internal resource identifier and an external resource identifier at an interactive voice response system that receives the call.

13. The method of claim 1, wherein the internal and external resource identifiers are generated in response to receipt of the call.

14. The method of claim 1, wherein establishing a connection with an online audio server comprises:
   sending the internal resource identifier from the interactive voice response system to a media gateway; and
   using the internal resource identifier to establish a connection between the media gateway and the online audio server.

15. The method of claim 14, wherein sending the first stream of audio data comprises:
   sending the first stream of audio data from the interactive voice response system to the media gateway; and
   sending the first stream of audio data from the media gateway to the online audio server over the connection established between the media gateway and the online audio server.

16. The method of claim 15, further comprising copying, at the media gateway, the first stream of audio data substantially simultaneously to the receiving of the audio message to generate a second stream of audio data.

17. The method of claim 16, further comprising the media gateway storing the second stream of audio data in a message store substantially simultaneously to the receiving of the audio message.

18. The method of claim 1 further comprising transcoding the audio data using an audio compression scheme prior to sending the first stream of transcoded audio data from the online audio server to the client system.

19. The method of claim 1, further comprising enabling the called party at the client system to react to a perceptible form of the first stream of audio data.

20. The method of claim 19, wherein enabling the called party to react includes enabling presentation of a visual call screening graphical user interface message commensurate with the sending of the first stream of audio data.

21. The method of claim 20 wherein the call screening message includes options that may be selected by the called party to react to the telephony call.

22. The method of claim 21 wherein the options include sending an outbound audio message to be perceived by the calling party.

23. The method of claim 21 wherein the options include sending the call to a call destination.

24. The method of claim 23 wherein the call destination is a direct number of a phone of the called party.

25. The method of claim 23 wherein the call destination is a direct number that is not a direct number of a phone of the called party.

26. The method of claim 21 wherein enabling the called party to react to the call includes:
   determining the online status of an online identity associated with the called party; and
   sending the call screening message to the client system of the called party conditioned upon whether the called party is online approximately when the call is received at the messaging service platform.

27. The method of claim 21 wherein enabling the called party to react includes enabling removal of the call screening graphical representation message upon detection that the audio message recording is complete.

28. The method of claim 21 wherein enabling the called party to react includes enabling the options to be selected only while the audio message is being received by the messaging service platform.

29. The method of claim 21 further comprising receiving an option selection from the client system of the called party.

30. The method of claim 29 further comprising handling the call in accordance with the received option selection.

31. The method of claim 30 wherein handling the telephony call includes sending an outbound audio message to be perceived by the calling party.

32. The method of claim 30 wherein handling the telephony call includes sending the telephony call to a predetermined call destination.

33. A computer system for screening a telephony call made by a calling party to a called party, the computer system configured to:
   receive, over a telephone network, a telephony call from the calling party at a messaging service platform;
   receive an audio message generated by the calling party as a first stream of audio data;
   establish a connection with an online audio server;
   send the first stream of audio data to the online audio server over the established connection;
   leverage an internal resource identifier to enable identification of the first stream of audio data at the online audio server;
   relate the internal resource identifier to an external resource identifier;
   send the external resource identifier to a client system;
   enable the client system to establish a connection with the online audio server;
   receive an indication of the external resource identifier from the client;
   use the received indication of the external resource identifier and its relationship to the internal resource identifier to enable identification of the first stream of audio data; and
   send the first stream of audio data to the client system over the connection established between the client system and the online audio server.

34. An apparatus for screening a telephony call made by a calling party to a called party, the apparatus comprising:
   means for receiving, over a telephone network, a telephony call from the calling party at a messaging service platform;
   means for receiving an audio message generated by the calling party as a first stream of audio data;
   means for establishing a connection with an online audio server;
   means for sending the first stream of audio data to the online audio server over the established connection;
   means for leveraging an internal resource identifier to enable identification of the first stream of audio data at the online audio server;
   means for relating the internal resource identifier to an external resource identifier;
   means for sending the external resource identifier to a client system;
   means for enabling the client system to establish a connection with the online audio server;
   means for receiving an indication of the external resource identifier from the client;
   means for using the received indication of the external resource identifier and its relationship to the internal resource identifier to enable identification of the first stream of audio data; and
   means for sending the first stream of audio data to the client system over the connection established between the client system and the online audio server.

35. A method for screening a telephony call made by a calling party to a called party, the method comprising:
   receiving, from a messaging service platform, an external resource identifier generated in response to receipt of a call at the messaging service platform;
   establishing a connection with an online audio server;
   communicating the external resource identifier to the online audio server;
   receiving a first stream of audio data over the established online audio server connection in response to communication of the external resource identifier;
   enabling perception of an audio message generated by the calling party by converting the first stream of audio data into audio,
   wherein the called party is made able to begin to perceive the audio message while the audio message is being deposited as a voicemail at the messaging service platform.

36. The method of claim 35, wherein the called party is made able to begin to perceive the audio message before the deposit of the voicemail at the messaging service platform is completed.

37. The method of claim 35, wherein the called party is made able to begin to perceive the audio message before the call originated by the calling party terminates.

38. The method of claim 35, wherein the external resource identifier is a universal resource locator.

39. The method of claim 35, further comprising enabling the called party to react to a perceptible form of the first stream of audio data.

40. The method of claim 39, wherein enabling the called party to react includes enabling presentation of a visual call screening graphical user interface message commensurate with the sending of the first stream of audio data.

41. The method of claim 40 wherein the call screening message includes options that may be selected by the called party to react to the telephony call.

42. The method of claim 41 wherein the options include sending an outbound audio message to be perceived by the calling party.

43. The method of claim 41 wherein the options include sending the call to a call destination.

44. The method of claim 43 wherein the call destination is a direct number of a phone of the called party.

45. The method of claim 43 wherein the call destination is a direct number that is not a direct number of a phone of the called party.

46. The method of claim 41 wherein enabling the called party to react to the call includes enabling the options to be selected only while the audio message is being received at the messaging service platform.

47. The method of claim 41 wherein enabling the called party to react to the call includes sending an option selection to the messaging service platform.

48. The method of claim 40 wherein enabling the called party to react to the call includes enabling removal of a display corresponding to the call screening message when the audio message completes.

49. A computer system for screening a telephony call made by a calling party to a called party, the computer system configured to:
receive, from a messaging service platform, an external resource identifier generated in response to receipt of a call at the messaging service platform;
establish a connection with an online audio server;
communicate the external resource identifier to the online audio server;
receive a first stream of audio data over the established online audio server connection in response to communication of the external resource identifier;
enable perception of an audio message generated by the calling party by converting the first stream of audio data into audio,
wherein the called party is made able to begin to perceive the audio message while the audio message is being deposited as a voicemail at the messaging service platform.

50. An apparatus for screening a telephony call made by a calling party to a called party, the apparatus comprising:
means for receiving, from a messaging service platform, an external resource identifier generated in response to receipt of a call at the messaging service platform;
means for establishing a connection with an online audio server;
means for communicating the external resource identifier to the online audio server;
means for receiving a first stream of audio data over the established online audio server connection in response to communication of the external resource identifier;
means for enabling perception of an audio message generated by the calling party by converting the first stream of audio data into audio,
wherein the called party is made able to begin to perceive the audio message while the audio message is being deposited as a voicemail at the messaging service platform.

* * * * *